United States Patent [19]
Shibahata et al.

[11] Patent Number: 4,527,654
[45] Date of Patent: Jul. 9, 1985

[54] STEERING CONTROL SYSTEM FOR AUTOMOTIVE VEHICLE OR THE LIKE

[75] Inventors: Yasuji Shibahata; Namio Irie, both of Yokohama; Kazuo Ikawa, Tokorozawa; Yohsuke Akatsu, Yokohama, all of Japan

[73] Assignee: Nissan Motor Co., Ltd., Yokohama, Japan

[21] Appl. No.: 476,712

[22] Filed: Mar. 18, 1983

[30] Foreign Application Priority Data

Mar. 24, 1982 [JP] Japan ................................ 57-45505

[51] Int. Cl.$^3$ .............................................. B62D 5/06
[52] U.S. Cl. .................................... 180/140; 180/142; 180/143
[58] Field of Search ............... 180/140, 141, 142, 143; 280/91

[56] References Cited

U.S. PATENT DOCUMENTS 2,998,263  8/1961  Mueller et al.
3,207,254  9/1965  d'Espinassy de Venel.
3,679,017  7/1972  Roe ................... 180/141 X
4,105,086  8/1978  Ishii et al. ............ 180/143 X
4,399,884  8/1983  Vandehey ............. 180/141
4,418,780 12/1983  Ito et al. .............. 180/142
4,440,254  4/1984  Shibahata et al. .... 180/140

FOREIGN PATENT DOCUMENTS 54766       6/1982  European Pat. Off. ...... 180/140
937810      1/1956  Fed. Rep. of Germany.
1630639     6/1971  Fed. Rep. of Germany.
3124821     1/1982  Fed. Rep. of Germany.
930380      1/1948  France.
55-147968  10/1980  Japan.
368063      4/1963  Switzerland.
2083422     3/1982  United Kingdom ........ 180/141

Primary Examiner—John A. Pekar
Attorney, Agent, or Firm—Schwartz, Jeffery, Schwaab, Mack, Blumenthal & Evans

[57] ABSTRACT

A delay which may take the form of a hydraulic flow restriction (either fixed or variable with a given parameter such as vehicle speed) or a suitable electronic delay circuit, is interposed between a device which outputs a signal indicative of the front wheels being steered and a device which is operatively connected with the rear wheels and which varies the orientation of the rear wheels in a manner to "steer" same in response to the signal to control the yawing of the vehicle.

4 Claims, 6 Drawing Figures

STEERING CONTROL SYSTEM FOR AUTOMOTIVE VEHICLE OR THE LIKE

BACKGROUND OF THE INVENTION

1. Field of the Invention

The present invention relates generally to a steering system for an automotive vehicle and more specifically to a system in which the rear wheels are "steered" to attenuate yawing and improve the handling of the vehicle during cornering or the like.

2. Description of the Prior Art

Despite numerous advances in suspension design, due to the need for insulating the vehicle chassis from the vibration produced in the suspension and steering systems of a vehicle, elastomeric insulators are inevitably provided at the points of connection of the above mentioned systems and the chassis. Accordingly, upon the vehicle being subjected to a centrifugal force during cornering, for example, the vehicle tends to yaw about an axis normal with respect to the vehicle chassis and deteriorate the handling of the vehicle under such circumstances. Sudden gusts of wind and or an uneven road surface are also apt to induce yawing.

SUMMARY OF THE INVENTION

It is an object of the present invention to provide a steering control system which in addition to steering the front wheels additionally controls the rear wheels in a manner to attenuate yawing of the vehicle and thus improve the handling characteristics of same during cornering or the like.

In general terms the present invention features a delay, which by way of example may take the form of a hydraulic flow restriction (which may be fixed or variable with a given parameter such as vehicle speed) or a suitable electronic delay circuit, which delay is interposed between a device which outputs a signal indicative of the front wheels being steered and a device which is operatively connected with the rear wheels and which varies the orientation of the rear wheels in a manner to "steer" same in response to the "delayed" signal to control the yawing of the vehicle.

More specifically, the present invention takes the form of a steering system for a vehicle having a forward wheel, a rear wheel and a longitudinal axis, comprising: a steering arrangement operatively connected with the front wheel for steering same in response to a manually produced steering signal, means for producing a signal indicative of the forward wheel being steered by the steering arrangement, a device operatively connected with the rear wheel which is responsive to the signal indicative of the forward wheel being steered for applying a bias to the rear wheel which tends to vary the orientation of the rear wheel with respect to the longitudinal axis, and signal modifying means interposed between the signal producing means and the device operatively connected with the rear wheel for modifying the signal applied to the device.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
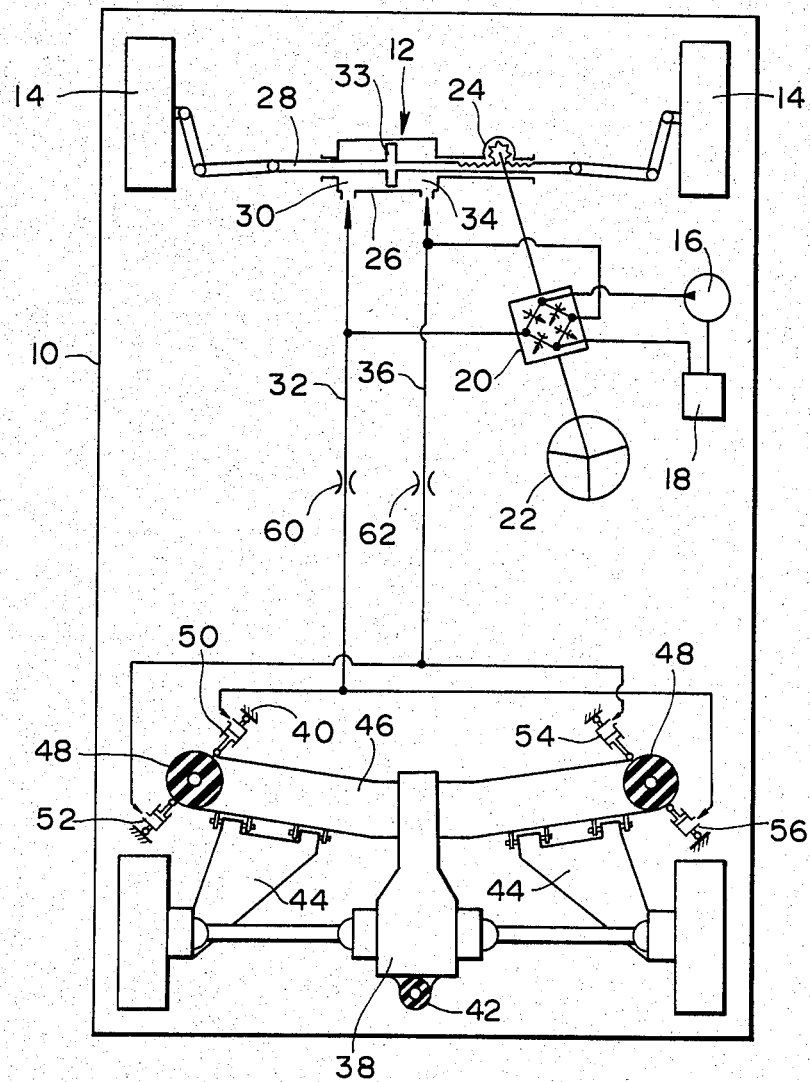
FIG. 1 is a schematic plan view of a first embodiment of the present invention.

FIG. 1 of the drawings shows a first embodiment of the present invention. In this arrangement the numeral 10 indicates a vehicle equipped with a power steering 12 which is associated with the front wheels 14. This power steering includes a pump 16 and a reservoir or sump 18. A control valve 20 of the power steering is fluidly communicated with the pump 16 and responsive to the rotation of a steering wheel 22 which is, as shown, mechanically connected to a rack and pinion steering gear 24. A hydraulic servo 26 is operatively connected to a tie rod 28 and fluidly connected to the control valve 20 in a manner that when the steering wheel 22 is rotated anti-clockwise, a chamber 30 of the servo 26 is pressurized with hydraulic fluid from the pump 16 through a conduit 32. This drives a piston 33 of the power steering servo 26 to the right as seen in the drawings to assist the steering of the front wheels. Conversely, when the steering wheel is rotated in the clockwise direction a chamber 34 of the servo 26 is pressurized via conduit 36 and the piston 33 is driven to stroke to the left (as seen in the drawings) to assist the turning of the wheels to the right.

The above kind of arrangement is of course well known, examples of such being found in U.S. Pat. No. 4,290,452 issued on Sept. 22, 1981 in the name of Takahashi et al and U.S. Pat. No. 4,137,989 issued on Feb. 6, 1979 in the name of Rehfeld.

The vehicle 10 is in this case, merely by way of example, a front engine-rear wheel drive type wherein the final drive or differential gear 38 is mounted to the vehicle chassis 40 through an elastomeric insulator 42. In this vehicle the rear suspension is, by way of example, a semi-trailing arm type wherein trailing arms 44 are pivotally mounted on a sub-frame 46. This subframe is in turn mounted to the vehicle through elastomeric insulators 48.

Figure 3:
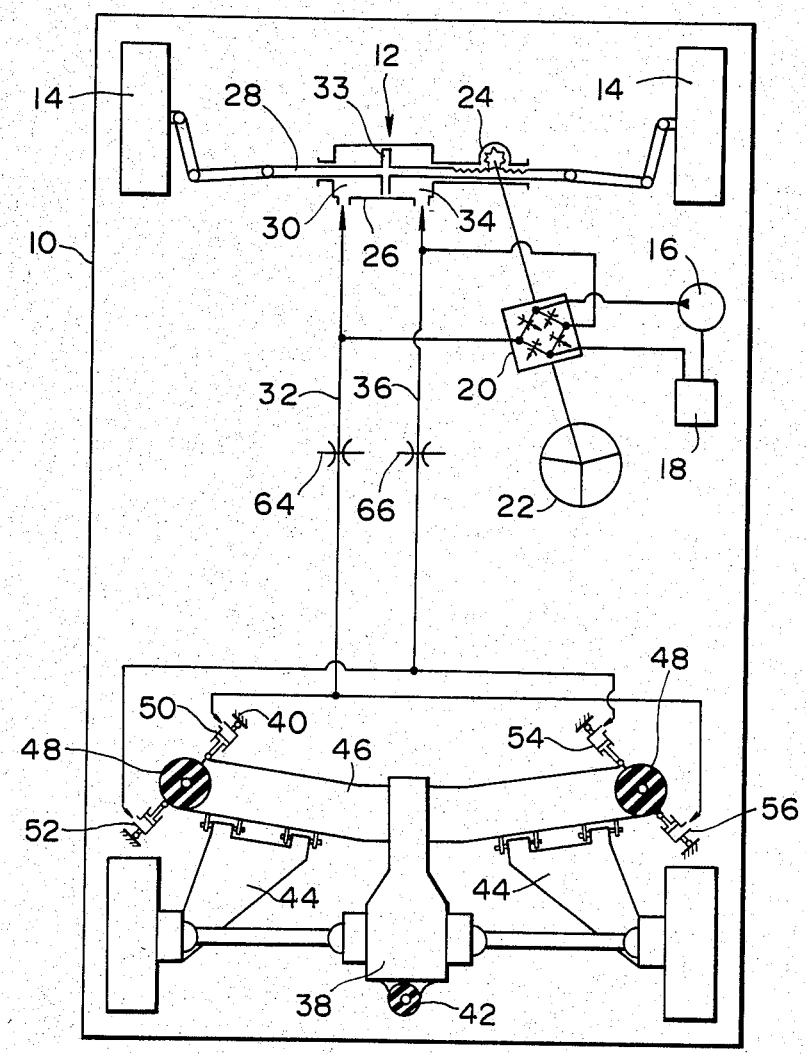
FIGS. 3, 4 and 5 are plan views showing second, third and fourth embodiments of the present invention, respectively.

Connected between the vehicle chassis 40 and the elastomeric insulators are telescopic shock absorber-like cylinders 50–56. These hydraulic cylinders are connected to the control valve 20 so that upon the steering wheel 22 being rotated in the anti-clockwise direction the cylinders 50 and 56 are pressurized through conduit 32 while cylinders 52 and 54 are depressurized via conduit 36 to bias the sub-frame 46 to rotate in a manner as shown in FIG. 3 (viz., rotate anti-clockwise as seen in the figure). Conversely, when the steering wheel is rotated in the clockwise direction the hydraulic cylinders 52 and 54 are pressurized while cylinders 50 and 56 are depressurized to cause the sub-frame to rotate in the reverse direction (viz., clockwise).

In this embodiment flow restrictors 60, 62 (such as calibrated orifices) are disposed in conduits 32, 36 respectively. These restrictors function to (a) delay the transmission of pressure between the power steering control valve 20 and the cylinders 50–56, (b) attenuate shocks originating in the rear suspension during normal running of the vehicle which would otherwise be transmitted back to the steering wheel 22 via the hydraulic servo and rack and pinion steering arrangement, and (c) smooth out the movement of the subframe 46 in the instance that one set of cylinders is suddenly pressurized while the other is depressurized.

Thus, with the above described arrangement, when the front wheels 14 are turned so as to induce the vehicle 10 to turn to the left (for example), the delay provided by the flow restrictors 60, 62 ensures that the rear wheels do not undergo simultaneous steering in the same direction and hinder the turning of the vehicle. Subsequently, the side force produced upon the vehicle traversing the arcuate path under the influence of the steering by the front wheels is timely opposed by the delayed bias applied to the sub-frame 46 of the rear suspension by the hydraulic cylinders 50-56, with the result that the rear wheels tend not to undergo the so called "compliance steering" phenomenon and the tendancy for the vehicle to yaw is attenuated.

Figure 2:
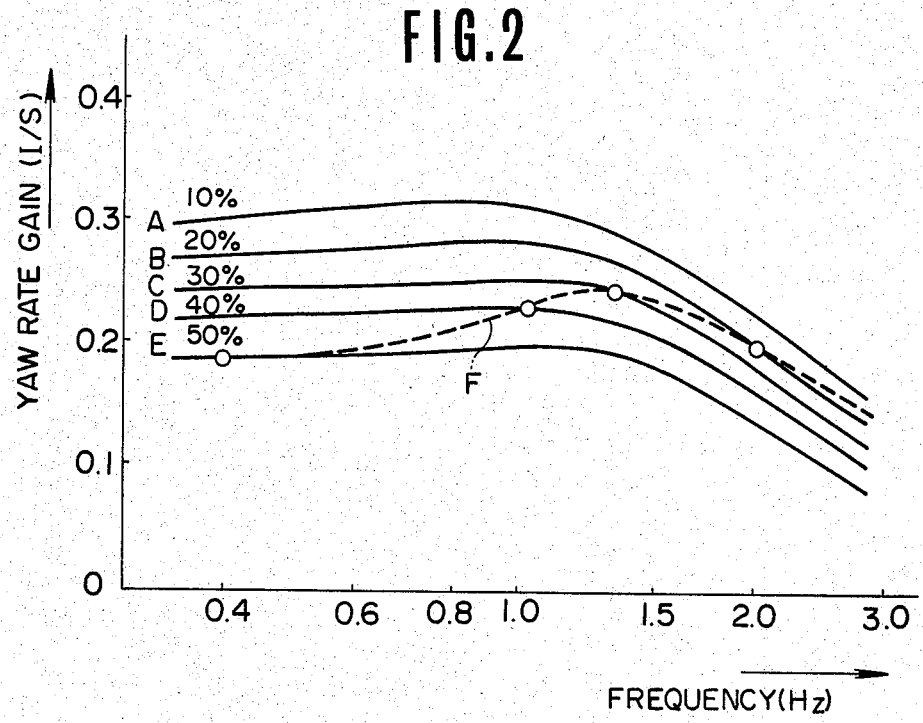
FIG. 2 is a graph showing in terms of frequency and yaw rate gain, the control characteristics provided by the first embodiment of the present invention.

The delay provided by the restrictors 60, 62 varies with the frequency of vibration passing through the fluid in the conduits 32, 36. This feature is illustrated in FIG. 2 of the drawings wherein the control characteristics provided by the first embodiment are shown in terms of frequency and yaw rate gain. In this figure, the curves A to E represent the characteristics of a system in which the flow restrictors are not provided and wherein the system is set to produce, in response to a predetermined amount of rotation of the steering wheel, rear wheel turning angle to front wheel sideslip angle ratios of 0%, 10%, 20%, 30% and 50% respectively. It should be noted at this point that the term "yaw rate" should be taken to mean the angular velocity of the vehicle about the vertical axis of the vehicle (viz., an axis normal to the chassis thereof). Now, as will be appreciated as the amount of steering of the rear wheels is increased from 0% (curve A) to 50% (curve B) the yaw rate gain is lowered as a whole and tends to render the handling of the vehicle stable. However, the yaw rate gain peaks at a given frequency when the system tends to resonate and tends to deteriorate the response of the vehicle to the steering of the front wheels.

The present invention overcomes this drawback via the provision of the orifices 60, 62 which produce an effect shown by the dotted line curve F. Viz., in the low frequency range in the order of 0.4 Hz, the orifices provide little or no effect on the pressure transmission, and the system accordingly functions as if the restrictors were in fact not provided. For the sake of explanation let it be assumed that the system is arranged to produce a rear wheel turning angle to front wheel sideslip angle ratio of 50% in response to the above mentioned predetermined amount of steering wheel rotation, so that at low frequencies (e.g. 0 to 0.5 Hz) the arrangement exhibits characteristics which approximate those shown in curve "E". However, as the frequency rises to approximately 1.0 Hz, the effect of the orifices increases to reduce the amount of rear wheel turning whereby the broken line curve F rises to intersect curve D. Subsequent increases in vibrational frequency produce the illustrated results wherein the broken line curve intersects curve C at approximately 1.3 Hz and curve B at 2.0 Hz. As will be appreciated the resonance frequency is shifted from approximately 1.0 Hz to the higher and less frequently experienced level of 1.4 Hz which markedly improves the handling of the vehicle in the more commonly encountered vibrational range.

FIG. 3 shows a second embodiment of the present invention. In this arrangement the fixed type of flow restrictors 60, 62 are replaced with adjustable units 64, 66. This of course allows for the ready adjustment of the system without recourse to troublesome replacement of fixed units.

Figure 4:
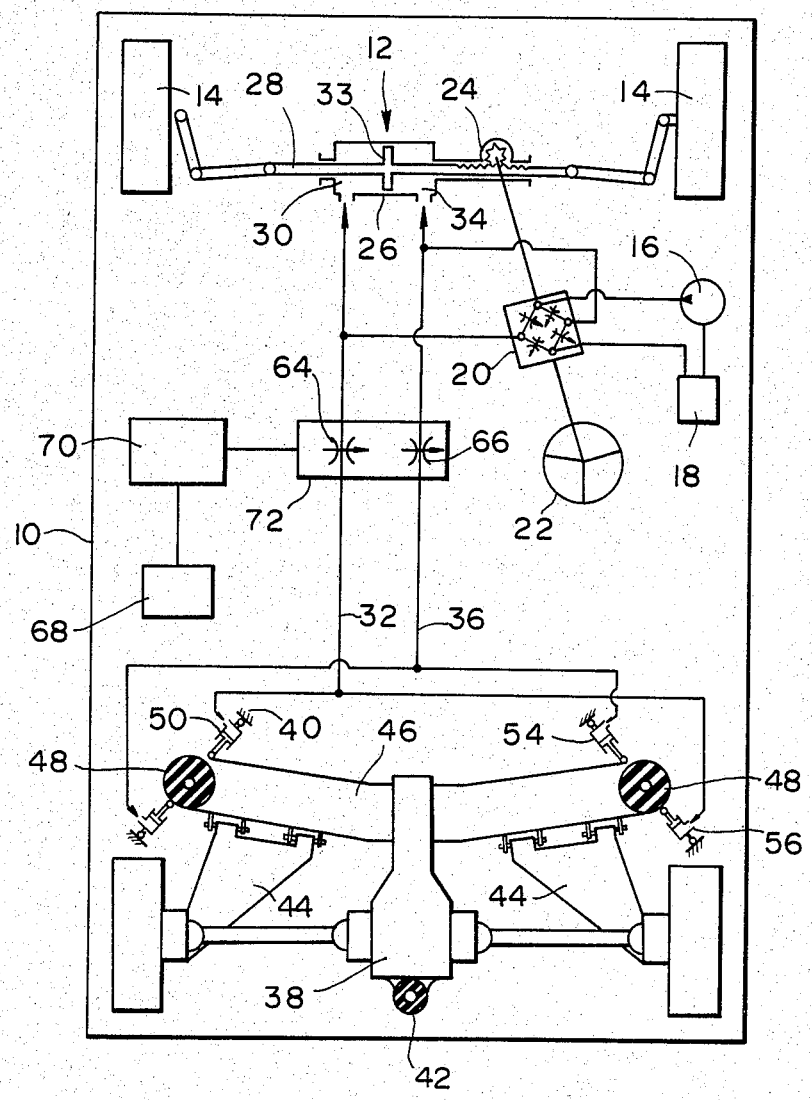

FIG. 4 of the drawings shows a third embodiment of the present invention wherein a vehicle speed sensor 68 is provided and operatively connected with adjustable flow restrictors 64, 66 through an amplifier 70 and suitable servo mechanism 72. With this arrangement as the speed of the vehicle increases the flow restriction provided by the variable restrictors 64, 66 can be increased (by way of example) so to limit the yaw rate gain at high vehicle speeds.

Figure 6:
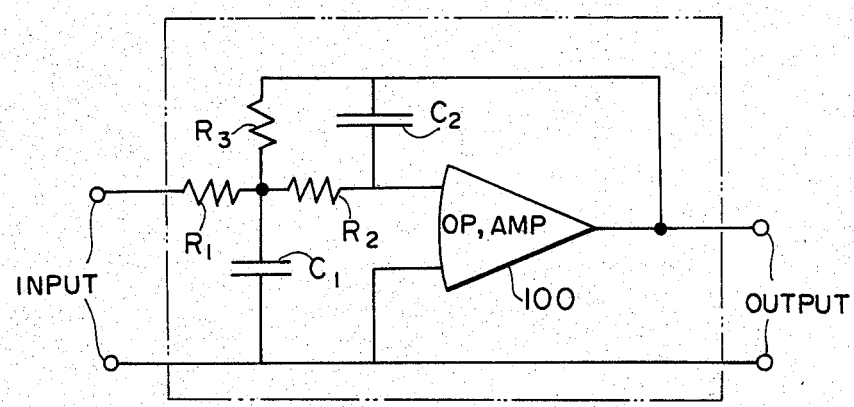
FIG. 6 is a circuit diagram showing an example of the circuitry used in the fourth embodiment.
Figure 5:
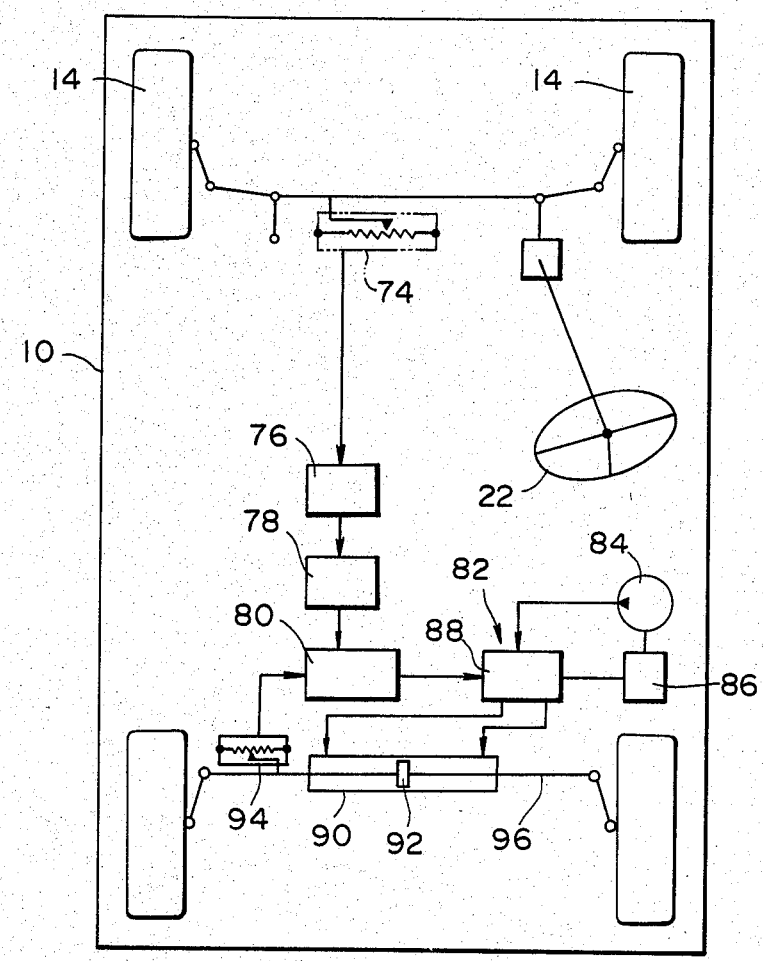

FIG. 5 shows a fourth embodiment of the present invention. In this arrangement the hydraulic control arrangements of the previous embodiments are replaced with an electronically controlled system. As shown, this arrangement includes a sensor 74, such as a variable resistor, for detecting the amount or turning of the front wheels 14. The output of this sensor is fed to a preamplifier unit 76 which in turn outputs a suitable signal to a primary delay circuit 78. This circuit is preferably of the type wherein the output thereof becomes attenuated or delayed in phase as the frequency of the input increases. An example of such a circuit is shown in FIG. 6. The operation of the arrangement including resistors $R_1$, $R_2$, $R_3$, capacitors $C_1$ and $C_2$ and an operation amplifier 100 is deemed clearly apparent to those skilled in the art and thus a redundant explanation of same will be omitted for brevity.

The output of the primary delay circuit 78 is supplied to a control circuit 80 which outputs a control signal to a hydraulic servo generally denoted by the numeral 82. This servo system includes a pump 84 which inducts fluid from a sump 86 and supplies same to a control valve 88 (e.g. a solenoid valve or the like). This valve (88) under the influence of the output from the control circuit 80 selectively pressurizes the chambers of a hydraulic servo cylinder 90 whereby a piston 92 is biased to "steer" the rear wheels through a suitable linkage arrangement 96 interconnecting said rear wheels and the piston. A "feedback" variable resistor 94 is connected to the linkage 96 and outputs a signal to the control circuit 80 indicative of the actual orientation of the rear wheels.

This embodiment of course can be used in vehicles wherein a power steering system is not provided and/or required. However, if desired the pump and sump of a power steering system may be employed in the fourth embodiment.

What is claimed is:

1. A steering system for a vehicle having a forward wheel, a rear wheel, and a longitudinal axis, comprising:
    a power steering servomechanism, including a power steering control valve, operatively connected to said front wheel for steering said front wheel in response to a manually-produced steering signal;
    a rear wheel suspension, including an expandable member having a variable volume chamber in fluid communication with said power steering control valve through a conduit so as to be expanded by a pressure signal produced by said power steering control valve when said front wheel is steered for applying a bias to said rear wheel acting to vary the orientation of said rear wheel with respect to said longitudinal axis; and a flow restrictor interposed in said conduit for modifying said pressure signal produced by said power steering control valve.

2. A steering system as claimed in claim 1, wherein said flow restrictor has an orifice of a predetermined size.

3. A steering system as claimed in claim 1, wherein said flow restrictor has an orifice of variable size.

4. A steering system as claimed in claim 3 further comprising a vehicle speed responsive device operatively connected to said flow restrictor for controlling the size of said variable size orifice.

* * * * *